BEST AVAILABLE COPY
Jan. 23, 1923. Re. 15,531
E. F. EDGECOMBE, JR.
CIRCULATION CONTROL SYSTEM.
ORIGINAL FILED MAY 11, 1915.
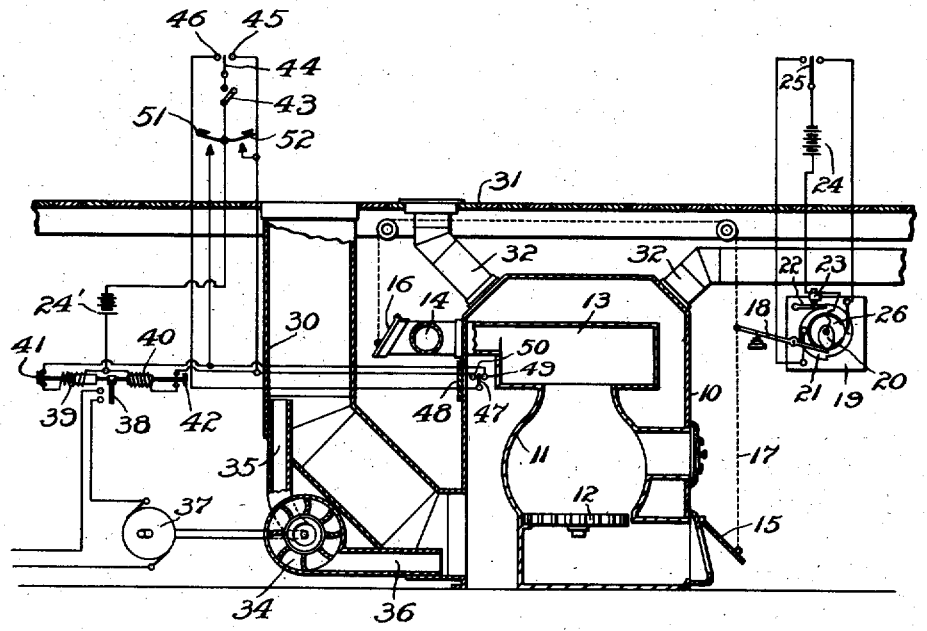
INVENTOR
Edward F. Edgecombe, Jr.,
BY
Arthur M. Hood.
ATTORNEY Reissued Jan. 23, 1923. Re. 15,531

UNITED STATES PATENT OFFICE.

EDWARD F. EDGECOMBE, JR., OF INDIANAPOLIS, INDIANA, ASSIGNOR TO THE HONEYWELL HEATING SPECIALTIES COMPANY, OF WABASH, INDIANA, A CORPORATION OF INDIANA.

CIRCULATION-CONTROL SYSTEM.

Original No. 1,138,854, dated May 11, 1915, Se ial No. 739,668, filed January 2, 1913. Application for reissue filed July 14, 1922. Serial No. 575,067.

*To all whom it may concern:*

Be it known that I, EDWARD F. EDGECOMBE, Jr., a citizen of the United States, residing at Indianapolis, in the county of Marion and State of Indiana, have invented a new and useful Circulation-Control System, of which the following is a specification.

In hot air heating systems the circulation of the air is frequently poor, in spite of the circulating tendency of the heating source, such as a furnace. This poor circulation may be due, for instance, to the direction of the wind. When the circulation of the heating air is poor, the temperature of the house or other space to be heated becomes uneven in different parts and cannot be maintained as high as desired, even though a good furnace fire is maintained. This results in a waste of fuel and a rapid deterioration of the furnace, not to mention the physical and psychical effect on the inhabitants of the house.

It is the primary object of my invention to improve this circulation when it is poor; and at the same time and thereby to maintain the temperature more nearly even and at the desired point; to economize in fuel; to lengthen the life of the furnace; and to reduce the care required for the operation of the furnace. In attaining these results, I provide means for producing a forced circulation of the heating air, and control such circulating means by the temperature of the furnace; by the temperature at a control point, as in the living room of a house; and, also, for the best results, I combine the circulation control device with means for automatically controlling the furnace drafts.

The single figure of the accompanying drawing illustrates semi-diagrammatically a furnace heating system embodying my invention.

In the arrangement shown there is a furnace 10 of any desired type, usually having a fire pot 11 above a grate 12, the products of combustion in the fire pot 11 passing through a radiator casing 13 and a smoke pipe 14 to a suitable chimney. Draft control doors 15 and 16, communicating with the space below the grate 12 and with the smoke pipe 14 respectively, are connected by a chain 17 to the operating lever 18 of any suitable automatic draft control system. In the case illustrated, this system comprises a spring motor 19, the shaft of which carries a cam 20 which rocks the lever 18 to open and close the furnace draft, the spring motor being provided with a ratchet wheel 21 which cooperates with a pawl 22 to prevent movement of the spring motor save when such pawl is lifted by an electro-magnet 23, which is energized from a battery 24 and controlled by the usual thermostat 25 in the living room or at some other control point and by a commutator 26 on the shaft of the motor 19 to permit a movement of such shaft to put on or shut off the furnace draft when the temperature at the control point reaches the predetermined minimum or maximum. Various forms of damper control schemes may be used, or in some instances none may be used, though the circulation control system hereinafter described works more advantageously when combined with a draft control system.

The air for heating is supplied to the furnace through a pipe 30, which may lead from any desired point, such as the outside atmosphere or from above the floor 31, the furnace ordinarily being located in the cellar. The air from the pipe 30 enters the furnace casing near the bottom, and passes upwardly around the fire pot 11 and radiator casing 13 to the top of the furnace, and thence out through the flues 32 to the rooms or other spaces to be heated. Under many conditions, the circulation of the air is maintained by the heat within the fire pot 11 and radiator casing 13. It is to assist this circulation when it is poor that I have provided my circulation control system. A blower 34, here a centrifugal fan, is suitably pneumatically connected to do this, in the case shown having its inlet pipe 35 opening upwardly into the pipe 30 and the discharge pipe 36 discharging into the furnace so that when the fan is operating it not only blows air out through the pipe 36 but by an injector action increases the flow through the pipe 30 in a shunt path to the blower. The blower 34 is driven by an electric motor 37, of any suitable type though here shown as a direct current motor. The circuit of the motor 37 is controlled by an electro-magnetically operated switch 38 having closing and opening coils 39 and 40, the circuits of which are broken automatically by auxiliary switch contacts 41 and 42 when such coils have respectively operated the switch. A battery 24′ which for convenience of illustration is shown as separate from the battery 24, though such is not necessarily the case, has one terminal connected in common to the coils 39 and 40, the other terminal being connected through a switch 43 to the movable member or tongue 44 of a thermostat located at the desired control point, such as the living room of the house. This thermostat has the usual "hot" and "cold" contact buttons 45 and 46. The "hot" button is connected through the auxiliary switch 42 to the opening coil 40 of the switch 38. The "cold" button 46 is connected to the movable member or tongue 47 of a thermostat located so that it is responsive directly to the heat of the furnace, conveniently by being mounted on a removable plate 48 so that it is within the furnace casing and in close proximity to the radiator casing 13. This thermostat also has "hot" and "cold" buttons 49 and 50, which are connected through the switches 41 and 42 to the closing and opening coils 39 and 40 respectively of the switch 38. The movable thermostat members 25 and 44 are here shown as separate members, for simplicity of illustration.

In operation, the thermostat 44 is preferably adjusted so that it engages its "hot" and "cold" contact buttons 45 and 46 at temperatures respectively very slightly above temperatures at which the thermostat 25 engages its "hot" and "cold" contact buttons, though other adjustments may be made. When the temperature in the house living room or other control point drops below the predetermined normal value, the thermostat 44 engages its "cold" contact button 46, and if the furnace is hot enough so that its thermostat 47 engages its "hot" contact button 49 at this time, this completes the circuit through the auxiliary switch 41 of the closing coil 39 of the switch 38 and starts the blower in operation to produce a forced circulation of the heating air. However, if the furnace is not sufficiently hot to make the thermostat 47 engage its "hot" contact button, the switch 38 is not closed, and the temperature in the living room may continue to fall until the thermostat 25 closes the circuit for the magnet 23 to raise the pawl 22 to allow the spring motor 19 to rock the arm 18 to open the furnace draft. If the fireman has been faithful, this opening of the drafts produces an increase in the furnace temperature, which, unless conditions are adverse, produces the desired circulation of the air through the pipe 30 and flue 32 to raise the room temperature. However, if conditions are adverse, the circulation thus produced by the increased heat of the furnace is not sufficient, and because of the lack of circulation the temperature of the furnace rises until the thermostat 47 engages its "hot" button 49. The thermostat 44 still being in engagement with its "cold" contact button 46, this closes the circuit through the auxiliary switch 41, for the closing coil 39 of the switch 38, thereby closing said switch to complete the motor circuit and opening the auxiliary switch 41 to break the circuit of the closing coil 39 after it has done its work. The motor 37 now drives the blower 34 to produce a forced circulation through the pipe 30, the furnace, and the flues 32, thereby enabling the full effect of the increased heat due to the opening of the furnace draft to be obtained. The improved circulation thus produced raises the temperature at the control point and elsewhere throughout the house. When the furnace is cooled sufficiently by this circulation to make the thermostat 47 engage its "cold" contact button 50, the thermostat 44 still being in engagement with its "cold" contact button 46; or when the temperature of the living room or other control point rises sufficiently to make the thermostat 44 engage its "hot" contact button 45; the circuit of the opening coil 40 is closed, through the auxiliary switch 42, thereby causing the opening of the switches 38 and 42 and the breaking of the circuits of both the motor 37 and the opening coil 40. When the temperature in the room reaches the upper temperature limit of the thermostat 25, the latter closes the circuit of the magnet 23 to raise the pawl 22 and allow the motor 19 to cooperate to close the door 15 and open the door 16, thus closing the furnace draft, the commutator 26 at the same time immediately breaking the circuit of the magnet 23.

By maintaining the circulation as above described, a much more even temperature is maintained throughout the house; the lifetime of the furnace is lengthened because of the prevention of the excessive heat which is otherwise produced therein; fuel is saved; and the time lag in the draft control system, due to the slowness with which the draft control apparatus responds to changes in the heating effect of the furnace is much reduced.

It will be readily understood that if thermostat 44 be adjusted so that it will remain in contact with the "cold" button 46 even when the room temperatures are as high as may be desired and as may be obtainable with any fire in the furnace, the thermostat 47 will then serve (switch 43 being closed) to automatically control the circulation fan, the fan starting and continuing to run only when the temperature of the furnace is high enough to justify forced circulation, and stopping, and remaining stopped, when, and so long as, the temperature of the furnace is too low. With this limited portion of the apparatus it is apparent that forced circulation will be avoided whenever the furnace temperatures are too low, and will be established, to assist in preventing the attainment of too high temperatures in the furnace itself, whenever the furnace temperatures are high enough.

The circulation control system may also be used for producing artificial ventilation in summer time. To this end, two push buttons 51 and 52 are provided at some convenient location, as near the thermostat 44, and are connected in common to the wire leading from the battery 24′ to the switch 43. The other terminals of these two push buttons are connected, through the auxiliary switches 41 and 42, to the closing and opening coils respectively, of the switch 38. The switch 43 being open, the motor 37 and blower 34 may be started and stopped as desired by manipulating the push buttons 51 and 52. These push buttons also provide a convenient means whereby when the furnace is going the forced circulation of the heating air may be controlled at will without the aid of the thermostat 44, for, with the switch 43 open, the device is rendered wholly non-automatic and the fan may be started by pressing the push button 51 and stopped by pressing the push button 52.

I claim as my invention:

1. In combination, a hot air heating plant, means for producing a forced circulation for said plant, temperature-responsive means for controlling said circulation producing means, and means responsive to the condition of the heating plant for controlling the effect produced by said temperature-responsive means.

2. In combination, a hot air furnace, a power-operated blower for assisting the circulation of heating air through said furnace, thermostatic means for controlling said blower, and means responsive to the condition of the furnace for controlling the effect produced by said thermostatic means.

3. In combination, a hot air furnace, power-operated means for producing a forced circulation of heating air through said furnace, a thermostat responsive to the temperature at a control point, and a second thermostat responsive to the temperature of the furnace, said two thermostats cooperating to control said circulation-producing means.

4. In combination, a hot air furnace, power-operated means for producing a forced circulation of heating air through said furnace, a thermostat responsive to the temperature at a control point, a second thermostat responsive to the temperature of the furnace, and an electro-magnetically operated device controlling the operation of said circulation-producing means and controlled by the joint action of said two thermostats.

5. In combination, a hot air furnace, power-operated means for producing a forced circulation of heating air therethrough, a thermostat located at a desired control point and having "hot" and "cold" contact buttons, a second thermostat responsive to the temperature of the furnace and also having "hot" and "cold" contact buttons, an electro-magnetically operated device controlling the operation of said circulation-producing means, and connections between said two thermostats and said electro-magnetically operated device whereby the latter is actuated to start the circulation-producing means in operation when the first thermostat engages its "cold" contact button and the second thermostat engages its "hot" contact button, and to stop the operation of the circulation-producing means when both thermostats engage their "cold" contact buttons or the first thermostat engages its "hot" contact button.

6. In combination, a hot air furnace, means for producing a forced circulation of heating air therethrough, temperature-responsive means for controlling said circulation-producing means, and temperature-responsive means for controlling the furnace draft.

7. In combination, a hot air furnace, means for producing a forced circulation of heating air therethrough, means controlled by the temperatures at a desired control point and at the furnace for controlling said circulation-producing means, and means controlled by the temperature at a desired control point for controlling the furnace draft.

8. In combination, a hot air furnace, means for producing a forced circulation of heating air therethrough, and means independently controlled by the temperatures at a desired control point and at the furnace for controlling said circulation-producing means.

9. In combination, a hot air heating plant, means for producing a forced circulation of heating air therethrough, temperature-responsive means for controlling said circulation-producing means, and temperature-responsive means for controlling the heat in said heating plant.

10. In combination, a hot air furnace, means of producing a forced circulation of heating air therethrough, and temperature-responsive means for controlling said circulation-producing means and the furnace draft.

11. In combination, a hot air furnace, means for producing a forced circulation of heating air therethrough, and means controlled by the temperature at a desired control point for controlling said circulation-producing means and the furnace draft and by the temperature at the furnace for controlling said circulation-producing means.

12. In combination, a hot air heating furnace, means for producing a forced circulation of heating air therethrough, and temperature responsive means, responsive to immediate furnace temperatures, for controlling said circulation-producing means, to automatically start said circulation means upon attainment of a desired furnace temperature and to prevent such movement when the furnace temperature is too low.

13. In combination, a hot air furnace, power-operated means for producing a forced circulation of heating air through said furnace, a thermostat responsive to the temperature of the space to be heated by said furnace, a second thermostat responsive to the temperature of the said furnace, and means through which said two thermostats cooperate to control said circulation-producing means.

14. In combination, a hot air furnace, power-operated means for producing a forced circulation of heating air through said furnace, a thermostat responsive to the temperature of the space to be heated by said furnace, a second thermostat responsive to the temperature of the furnace, and an electro-magnetically operated device controlling the operation of said circulation-producing means and controlled by the inter-dependent action of said two thermostats.

15. In combination, a hot air furnace, means for producing a forced circulation of heating air therethrough, means responsive to the temperature of the space to be heated by said furnace for controlling said circulation-producing means, and means responsive to the temperature of the space to be heated by said furnace for controlling the furnace draft.

16. In combination, a hot air furnace, means for producing a forced circulation of heating air therethrough and means responsive to the temperature of the space to be heated by said furnace for controlling both said circulation-producing means and the furnace draft.

17. In combination, a hot air heating plant, means for producing a forced circulation of heating air therethrough, means responsive to the temperature of the space to be heated by said plant for controlling said circulation-producing means, and means responsive to the temperature of the space to be heated by said plant for controlling the heat in such heating plant.

18. In combination, a hot air heating plant, means for producing a forced circulation of heating air therethrough, and means responsive to the temperature of the space to be heated by said furnace for controlling both said circulation-producing means and the heat in said heating plant.

19. In combination, a hot air furnace, means for producing a forced circulation of heating air therethrough, and means controlled by the temperature of the space to be heated by said furnace for controlling said circulation-producing means and the furnace draft and by the temperature at the furnace for controlling said circulation-producing means.

20. The combination with a hot air furnace, of a forced circulation means for the heating air including a motor, and means for controlling the movement of said motor, comprising a thermostat arranged within the immediate temperature influence of the furnace.

21. The combination with a hot air furnace of a circulation fan arranged to affect the flow of air through the heating spaces of said furnace, an electric motor for driving said fan, and a thermostat arranged within the immediate temperature influence of the furnace for controlling said fan motor to limit its movement to periods during which the furnace is at or above the desired temperature.

In witness whereof, I have hereunto set my hand at Indianapolis, Indiana, this 6th day of July, A. D. one thousand nine hundred and twenty-two.

EDWARD F. EDGECOMBE, JR.